United States Patent
Zheng et al.

(10) Patent No.: US 12,417,112 B2
(45) Date of Patent: Sep. 16, 2025

(54) VIRTUAL MACHINE MIGRATION METHOD AND SYSTEM

(71) Applicant: Alibaba Group Holding Limited, Grand Cayman (KY)

(72) Inventors: Xiao Zheng, Shanghai (CN); Lixiang Lin, Shanghai (CN); Xin Long, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 806 days.

(21) Appl. No.: 17/485,071

(22) Filed: Sep. 24, 2021

(65) Prior Publication Data

US 2022/0012087 A1    Jan. 13, 2022

Related U.S. Application Data

(63) Continuation of application No. PCT/CN2020/079127, filed on Mar. 13, 2020.

(30) Foreign Application Priority Data

Mar. 25, 2019  (CN) .......................... 201910227209.4

(51) Int. Cl.
  *G06F 9/455*    (2018.01)
  *G06F 9/48*     (2006.01)
  *G06T 1/60*     (2006.01)

(52) U.S. Cl.
  CPC ........ *G06F 9/45558* (2013.01); *G06F 9/4856* (2013.01); *G06T 1/60* (2013.01); *G06F 2009/4557* (2013.01)

(58) Field of Classification Search
  CPC .. G06F 9/45558; G06F 9/4856; G06F 9/5088; G06F 2009/4557; G06T 1/60
  See application file for complete search history.

(56) References Cited

U.S. PATENT DOCUMENTS 6,115,763 A *  9/2000  Douskey ............... G06F 11/267
                                                      710/72
8,659,590 B1 *  2/2014  Stam ....................... G06T 19/00
                                                      463/36
(Continued)

FOREIGN PATENT DOCUMENTS

CN        101419558 A     4/2009
CN        102446119 A     5/2012
(Continued)

OTHER PUBLICATIONS

James Gleeson et al.,, "Crane—Fast and Migratable GPU Passthrough for OpenCL applications", May 22, 2017, SYSTOR '17: Proceedings of the 10th ACM International Systems and Storage Conference, pp. 1-13 (Year: 2017).*
(Continued)

*Primary Examiner* — April Y Blair
*Assistant Examiner* — Zhi Chen
(74) *Attorney, Agent, or Firm* — Lee & Hayes, P.C.

(57) ABSTRACT

A migration method and a migration system of a virtual machine are disclosed. The method includes: a virtual machine detecting whether a migration instruction is received, wherein the virtual machine runs on a first processor of a first host machine; the virtual machine calling and obtaining video memory data generated in the first processor if the migration instruction is detected; and the virtual machine migrating the video memory data to a second processor of a second host machine. The present disclosure solves the technical problem that a virtual machine using a GPU pass-through mode fails to perform a live migration between host machines in the existing technologies.

19 Claims, 10 Drawing Sheets

(56) References Cited

U.S. PATENT DOCUMENTS

| | | | |
|---|---|---|---|
| 9,189,261 B2* | 11/2015 | Masood | G06F 9/455 |
| 10,180,852 B2* | 1/2019 | Spracklen | G06F 9/45558 |
| 10,534,730 B1* | 1/2020 | Nadarajah | G06F 3/0659 |
| 12,034,740 B1* | 7/2024 | Carmack | H04L 63/1416 |
| 2010/0262722 A1* | 10/2010 | Vauthier | G06F 9/45558 718/1 |
| 2011/0084973 A1 | 4/2011 | Masood | |
| 2011/0131576 A1 | 6/2011 | Ikegaya et al. | |
| 2011/0145471 A1 | 6/2011 | Corry et al. | |
| 2012/0042034 A1* | 2/2012 | Goggin | G06F 3/0647 709/216 |
| 2013/0254368 A1* | 9/2013 | Guay | G06F 9/45558 709/223 |
| 2014/0173628 A1* | 6/2014 | Ramakrishnan Nair | G06F 9/45533 718/108 |
| 2015/0033220 A1* | 1/2015 | Venkat | G06F 9/45558 718/1 |
| 2017/0132744 A1* | 5/2017 | Wilt | G06T 1/20 |
| 2017/0371696 A1* | 12/2017 | Prziborowski | G06F 9/45558 |
| 2018/0113731 A1* | 4/2018 | Cheng | G06F 9/45558 |
| 2018/0146020 A1* | 5/2018 | McClure | H04L 65/762 |
| 2018/0349162 A1* | 12/2018 | Tian | G06F 9/45558 |
| 2018/0373556 A1* | 12/2018 | Tian | G06F 9/45533 |
| 2019/0121663 A1* | 4/2019 | Guo | G06F 9/45558 |
| 2019/0213032 A1* | 7/2019 | Eyal | G06F 9/455 |
| 2019/0377594 A1* | 12/2019 | Xie | G06F 9/45558 |
| 2020/0364091 A1* | 11/2020 | Xia | G06F 9/542 |

FOREIGN PATENT DOCUMENTS

| | | |
|---|---|---|
| CN | 103812823 A | 5/2014 |
| CN | 106020929 A | 10/2016 |
| CN | 106569876 A | 4/2017 |
| CN | 106991007 A | 7/2017 |
| CN | 108874506 A | 11/2018 |
| WO | WO2018040112 A1 | 3/2018 |
| WO | WO2019000358 A1 | 1/2019 |

OTHER PUBLICATIONS

International Search Report mailed Jun. 15, 2020, from PCT Application No. PCT/CN2020/079127, 2 pages.

Written Opinion mailed Jun. 15, 2020, from PCT Application No. PCT/CN2020/079127, 4 pages.

Extended European Search Report mailed Nov. 23, 2022 for European Patent Application No. 20779006.4, 9 pages.

Takizawa, et al., "CheCUDA: A Checkpoint/Restart Tool for CUDA Applications", 2009 International Conference on Parallel and Distributed Computing, Applications and Technologies, Dec. 8, 2009, pp. 408-413.

English Translation of Chinese First Office Action for corresponding Chinese Application No. 201910227209.4, dated Feb. 6, 2024.

English Translation of Chinese First Search Report for corresponding Chinese Application No. 201910227209.4, dated Feb. 6, 2024.

European Office Action mailed Mar. 12, 2024 for European Application No. 207790.

Examination Report for European Application No. 20779006.4, Dated Apr. 14, 2025, 5 pages.

\* cited by examiner

VIRTUAL MACHINE MIGRATION METHOD AND SYSTEM

CROSS REFERENCE TO RELATED PATENT APPLICATIONS

This application claims priority to and is a continuation of PCT Patent Application No. PCT/CN2020/079127 filed on 13 Mar. 2020, and is related to and claims priority to Chinese Application No. 201910227209.4, filed on 25 Mar. 2019 and entitled "Virtual Machine Migration Method and System," which are hereby incorporated by reference in their entirety.

TECHNICAL FIELD

The present disclosure relates to the field of computers, and in particular, to virtual machine migration methods and systems.

BACKGROUND

At present, GPUs, such as NVIDIA GPUs, are widely used for training and reasoning in the fields of artificial intelligence (AI), machine learning and the like, and all types of computations of training and reasoning account for more than 80% of consumption of all GPUs. Meanwhile, a CUDA (Compute Unified Device Architecture) is used as a unique software matching system for AI and machine learning, and establishes an integrated uplink and downlink application scenario by matching with a GPU.

A CUDA core is a basic operation unit of a GPU, and the GPU is composed of thousands of CUDA cores, which is also called sp (streaming processor). Since GPU pass-through technologies do not perform information interception and rebuild at a host machine end, state information of a CUDA core cannot be known, and therefore a virtual machine cannot be subjected to a live migration. Thus, the following problems still exist when machine learning and other applications are used on public clouds: a virtual machine using a GPU pass-through mode does not have the capability of live migration. This limits operations that rely on live migration capabilities on many public clouds, such as load balancing, active operation and maintenance, hardware replacement and system software updates.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present disclosure provide virtual machine migration methods and systems, which at least solve the technical problem that a virtual machine using a GPU pass-through mode fails to perform a live migration between host machines in existing technologies.

According to the embodiments of the present disclosure, a virtual machine migration method is provided, and includes: a virtual machine detecting whether a migration instruction is received, wherein the virtual machine runs on a first processor of a first host machine; the virtual machine calling and obtaining video memory data generated in the first processor if the migration instruction is detected; and the virtual machine migrating the video memory data to a second processor of a second host machine.

According to the embodiments of the present disclosure, a virtual machine migration system is also provided, and includes: a virtual machine running on a first processor of a first host; and a migration module running on the virtual machine and being used for storing video memory data generated by the first processor and migrating the video memory data to a second processor of a second host machine if the migration module receives a migration instruction.

According to the embodiments of the present disclosure, a virtual machine migration method is provided, including: detecting, by a migration module running in a virtual machine, whether a migration instruction is received, wherein the virtual machine runs on a first processor of a first host machine; determining whether the first processor enters a migration state if the migration instruction is detected; and the virtual machine calling and obtaining video memory data generated in the first processor and migrating the video memory data to a second processor of a second host machine if the first processor enters the migration state.

According to the embodiments of the present disclosure, a storage medium is provided, the storage medium including a stored program, wherein: a device on which the storage medium is located is controlled to perform the following steps when the program is executed: a virtual machine detecting whether a migration instruction is received, wherein the virtual machine runs on a first processor of a first host machine; the virtual machine calling and obtaining video memory data generated in the first processor if the migration instruction is detected; and the virtual machine migrating the video memory data to a second processor of a second host machine.

According to the embodiments of the present disclosure, a processor is provided, and the processor is configured to execute a program, wherein the program, when running, executes the following steps: a virtual machine detecting whether a migration instruction is received, wherein the virtual machine runs on a first processor of a first host machine; the virtual machine calling and obtaining video memory data generated in the first processor if the migration instruction is detected; and the virtual machine migrating the video memory data to a second processor of a second host machine.

In the embodiments of the present disclosure, a virtual machine detects whether a migration instruction is received, wherein the virtual machine runs on a first processor of a first host machine. If the migration instruction is detected, the virtual machine calls and obtains video memory data that is generated in the first processor, and migrates the video memory data to a second processor of a second host machine. According to the above solution, video memory data of a first processor is stored in a virtual machine through a migration instruction detected by the virtual machine, and the video memory data of the first processor is migrated to a video memory of a second processor by the virtual machine, thus implementing a live migration of virtual machines in different host machines. Therefore, the embodiments of the application solve the technical problem that a virtual machine using a GPU pass-through mode fails to perform a live migration between host machines in the existing technologies.

BRIEF DESCRIPTION OF THE DRAWINGS

The accompanying drawings described herein are used to provide a further understanding of the present disclosure and form a part of the present application. Illustrative embodiments of the present disclosure and descriptions thereof serve to explain the present disclosure, and are not to be construed as limitations to the present disclosure. In the drawings.

DETAILED DESCRIPTION

Figure 1:
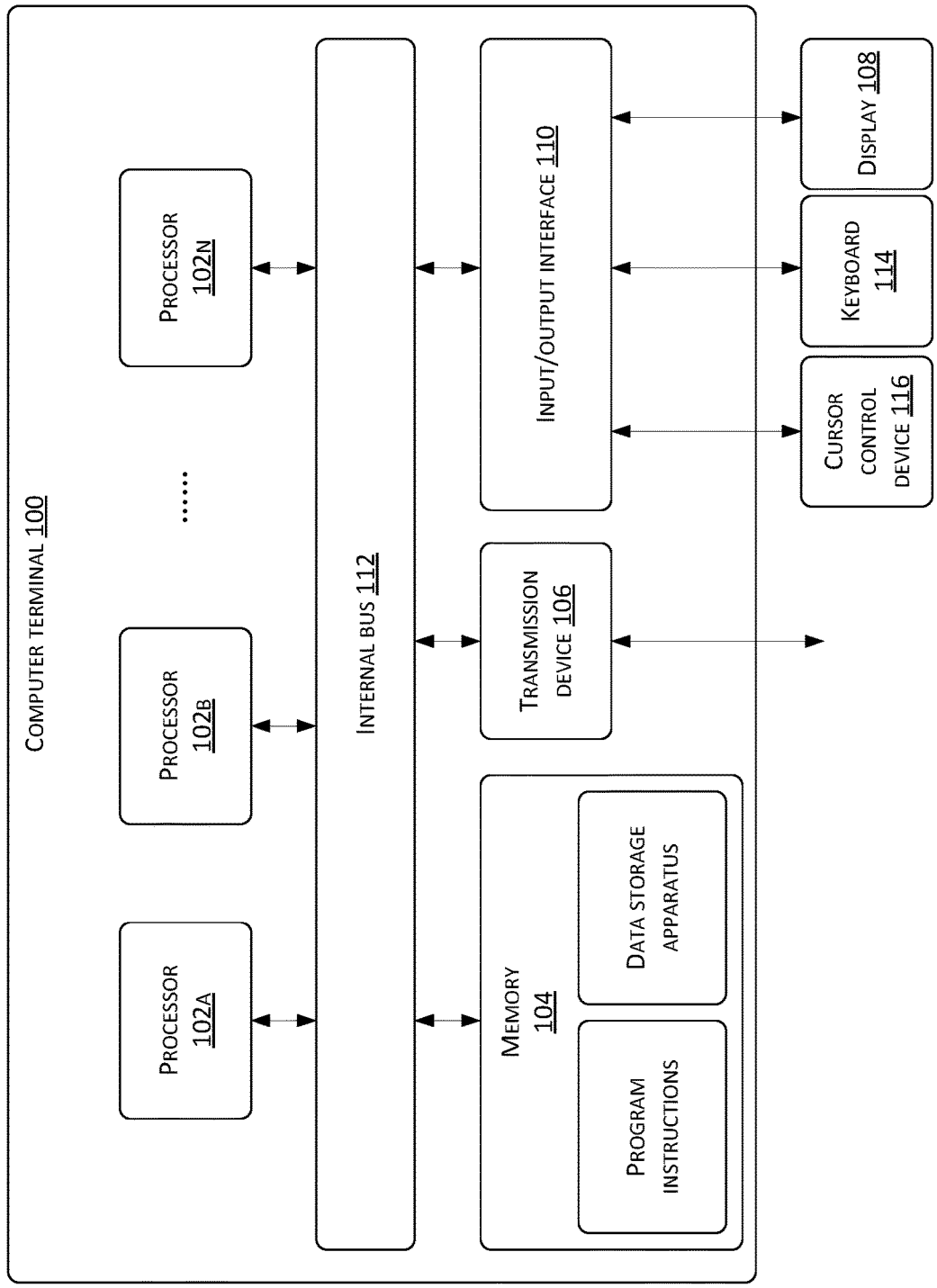
FIG. 1 shows a block diagram of a hardware configuration of a computer terminal (or a mobile device) for implementing a migration method of a virtual machine.

In order to enable one skilled in the art to better understand the technical solutions of the present disclosure, the technical solutions in the embodiments of the present disclosure will be clearly and completely described hereinafter with reference to the drawings in the embodiments of the present disclosure. Apparently, the described embodiments represent only a part and not all of the embodiments of the present disclosure. All other embodiments, which can be derived by one skilled in the art from the embodiments given herein without making any creative effort, shall fall within the scope of protection of the present disclosure.

It should be noted that terms "first," "second," and the like in the description and claims of the present disclosure and in the drawings described above are used for distinguishing between similar elements and not necessarily used for describing a particular sequential or chronological order. It is to be understood that data so used is interchangeable under appropriate circumstances, such that the embodiments of the present disclosure described herein can be implemented in orders other than those illustrated or described herein. Furthermore, terms "including," "having," and any variations thereof, are intended to cover a non-exclusive inclusion, such that a process, method, system, article, or device that includes a list of steps or elements is not necessarily limited to those steps or elements that are expressly listed, but may include other steps or elements that are not expressly listed or that are inherent to such process, method, article, or device.

First, some nouns or terms that appear in the description of the embodiments of the present application are applicable to the following explanations:

GPU: Graphics Processing Unit, a graphics processor, which is a microprocessor that performs image computations on a personal computer, a workstation, a game machine, and a mobile device.

GPU pass-through: A GPU pass-through refers to a physical GPU assigned to each virtual desktop user, and the GPU pass-through can avoid an overhead of an abstraction layer brought by a GPU sharing mode. In a GPU sharing mode, a virtual machine uses a virtual graphics card that is virtualized by software and does not physically exist. All image information is packaged into this virtual graphics card, while commands of the virtual graphics card are executed by a CPU, thus having a low efficiency. In a GPU pass-through, a virtual machine realizes that a direct mapping of a physical display card into the virtual machine. In this case, image information of the virtual machine is not required to be handed to a virtual display card, but is directly sent to a real display card for computations, having a relatively higher efficiency.

Live migration: Virtual machines can be migrated between different hosts without interrupting internal tasks of the virtual machines.

Hypervisor: A host virtualization management component, which is a software layer running between a physical server and an operating system, and can allow a plurality of operating systems and applications to share a set of basic physical hardware for coordinating access to hardware resources.

According to the embodiments of the present disclosure, an embodiment of a virtual machine migration method is also provided. It needs to be noted that steps illustrated in a flowchart of an accompanying drawing may be performed in a computer system such as a set of computer-executable instructions. Moreover, although a logical order is illustrated in a flowchart, in some cases, illustrated or described steps may be performed in an order different than those described herein.

The method provided in the embodiments of the present disclosure may be executed in a mobile terminal, a computer terminal or a similar computing device. FIG. 1 shows a block diagram of the hardware structure of a computer terminal (or a mobile device) used to implement a virtual machine scheduling method. As shown in FIG. 1, a computer terminal 100 (or a mobile device 100) may include one or more (shown as 102a, 102b, . . . , 102n in the figure) processors 102 (the processor 102 may include, but is not limited to, a processing device such as a micro-processor MCU or a programmable logic device FPGA), a memory 104 used for storing data, and a transmission device 106 used for communication functions. In addition, a display 108, an input/output interface (I/O interface) 110, a universal serial bus (USB) port 112 (which may be included as one of the ports of I/O interface), a keyboard 114, a cursor control device 116, etc. In implementations, the computer terminal 100 may further include a network interface, a power supply and/or a camera (which are not shown in the figure). One of ordinary skill in the art can understand that the structure shown in FIG. 1 is intended for illustration only, and is not construed as a limitation to the structure of the above electronic device. For example, the computer terminal 100 may also include more or fewer components than those shown in FIG. 1, or have a configuration different from that shown in FIG. 1.

It needs to be noted that the one or more processors 102 and/or other data processing circuits may generally be referred to as "data processing circuits" herein. The data processing circuit can be embodied in whole or in part as software, hardware, firmware or any other combination. In addition, the data processing circuit may be a single independent processing module, or fully or partially integrated into any one of other components in the computer terminal 100 (or the mobile device). As mentioned in the embodiments of the present disclosure, the data processing circuit is used as a type of processor control (for example, a selection of a variable resistance terminal path that is connected to an interface).

The memory 104 may be configured to store software programs and modules of application software, such as program instructions/data storage devices corresponding to the virtual machine scheduling method in the embodiments of the present disclosure. The processor(s) 102 execute(s) various functional applications and data processing by software program(s) and module(s) stored in the memory 104, i.e., implementing the virtual machine scheduling method. The memory 104 may include a high-speed random access memory, and may also include a non-volatile memory, such as one or more magnetic storage devices, flash memory, or other non-volatile solid-state memory. In some examples, the memory 104 may further include storage devices that are remotely deployed with respect to processor(s) 102, and these storage devices may be connected to the computer terminal 100 via a network. Examples of the network include, but are not limited to, the Internet, a corporate intranet, a local area network, a mobile communication network, and a combination thereof.

The transmission device 106 is configured to receive or send data via a network. Specific examples of the network may include a wireless network provided by a communication provider of the computer terminal 100. In an example, the transmission device 106 includes a network adapter (Network Interface Controller, NIC), which can be connected to other network devices through a base station to communicate with the Internet. In an example, the transmission device 106 may be a radio frequency (RF) module, which is used to communicate with the Internet wirelessly.

The display 108 may be, for example, a touch screen liquid crystal display (LCD), which may enable a user to interact with a user interface of the computer terminal 100 (or the mobile device).

It needs to be noted herein that, in some exemplary embodiments, the computer device (or the mobile device) shown in FIG. 1 described above may include hardware elements (including circuits), software elements (including computer codes stored on a computer-readable medium), or a combination of both hardware and software elements. It should be noted that FIG. 1 is only an example of a particular specific embodiment, and is intended to illustrate types of components that may be present in a computer device (or a mobile device) as described above.

Figure 2:
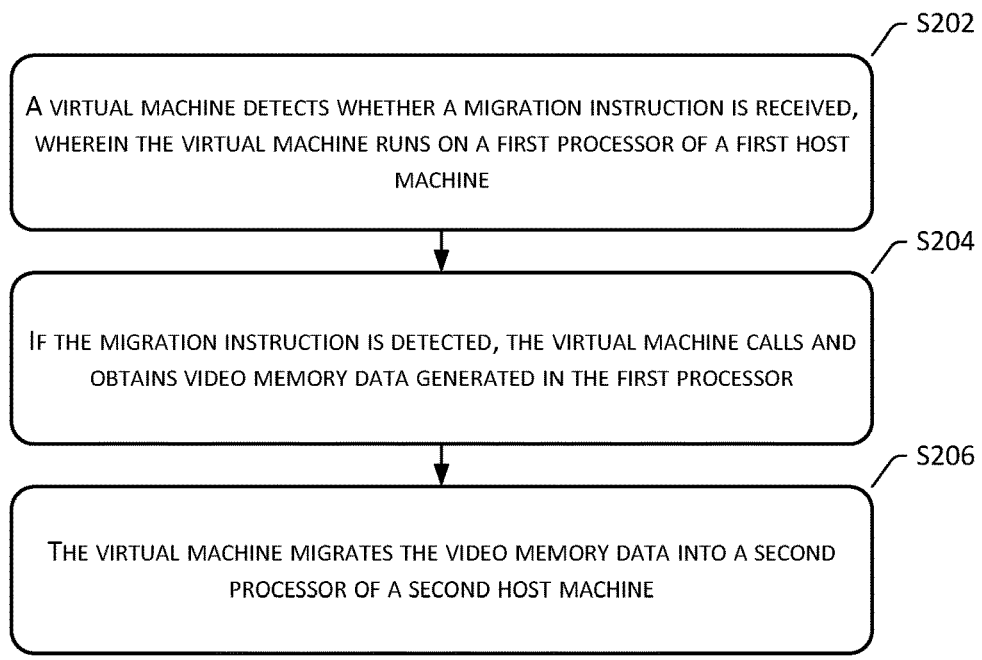
FIG. 2 is a flowchart of a live migration method of a virtual machine according to the embodiments of the present application.

Under the above operating environment, the present application provides a method for a live migration of a virtual machine as shown in FIG. 2. FIG. 2 is a flowchart of a method 200 for a live migration of a virtual machine according to the embodiments of the present application.

At step S202, a virtual machine detects whether a migration instruction is received, wherein the virtual machine runs on a first processor of a first host machine.

In implementations, the virtual machine runs on a first host machine, and a first processor in the first host machine may be a GPU in a pass-through mode, and provides services to the virtual machine in the pass-through mode. By adopting a GPU pass-through mode, an overhead of an abstraction layer caused by a GPU sharing mode can be avoided, and the performance of delivery is similar to that of a special desktop.

In implementations, a migration module is disposed in the virtual machine, and the migration module in the virtual machine detects a migration instruction sent by a console. After receiving the migration instruction sent by the console, the migration module starts to perform migration of the virtual machine.

At step S204, if the migration instruction is detected, the virtual machine calls and obtains video memory data generated in the first processor.

In implementations, the video memory data generated by the first processor includes an operation result obtained when the first processor operates task(s) of the virtual machine.

In implementations, the first processor is a GPU, and AI application(s) is/are run on the virtual machine, and is/are processed by a plurality of processing units (CUDA cores) that are included in the GPU. The processing units execute task(s) of the AI application(s), and store an operation result in a video memory of the GPU.

In the above solution, the migration module includes a save/restore unit. After receiving the migration instruction, the migration module obtains video memory data that is generated by the first processor for executing the task(s) of the virtual machine from the video memory of the first processor, and stores the obtained video memory data in the save/restore unit of the migration module.

At step S206, the virtual machine migrates the video memory data into a second processor of a second host machine.

In the above solution, the video memory data is moved to a second processor of a second host machine by the migration module in the virtual machine. The second host machine is a destination host, i.e. a host indicated in the migration instruction.

The second processor may still be a GPU in the pass-through mode. After the virtual machine migrates the video memory data into the second processor, the virtual machine may continue to operate with the support of the second processor according to the migrated video memory data, thereby completing a live migration of the virtual machine from the first host machine to the second host machine.

Figure 3:
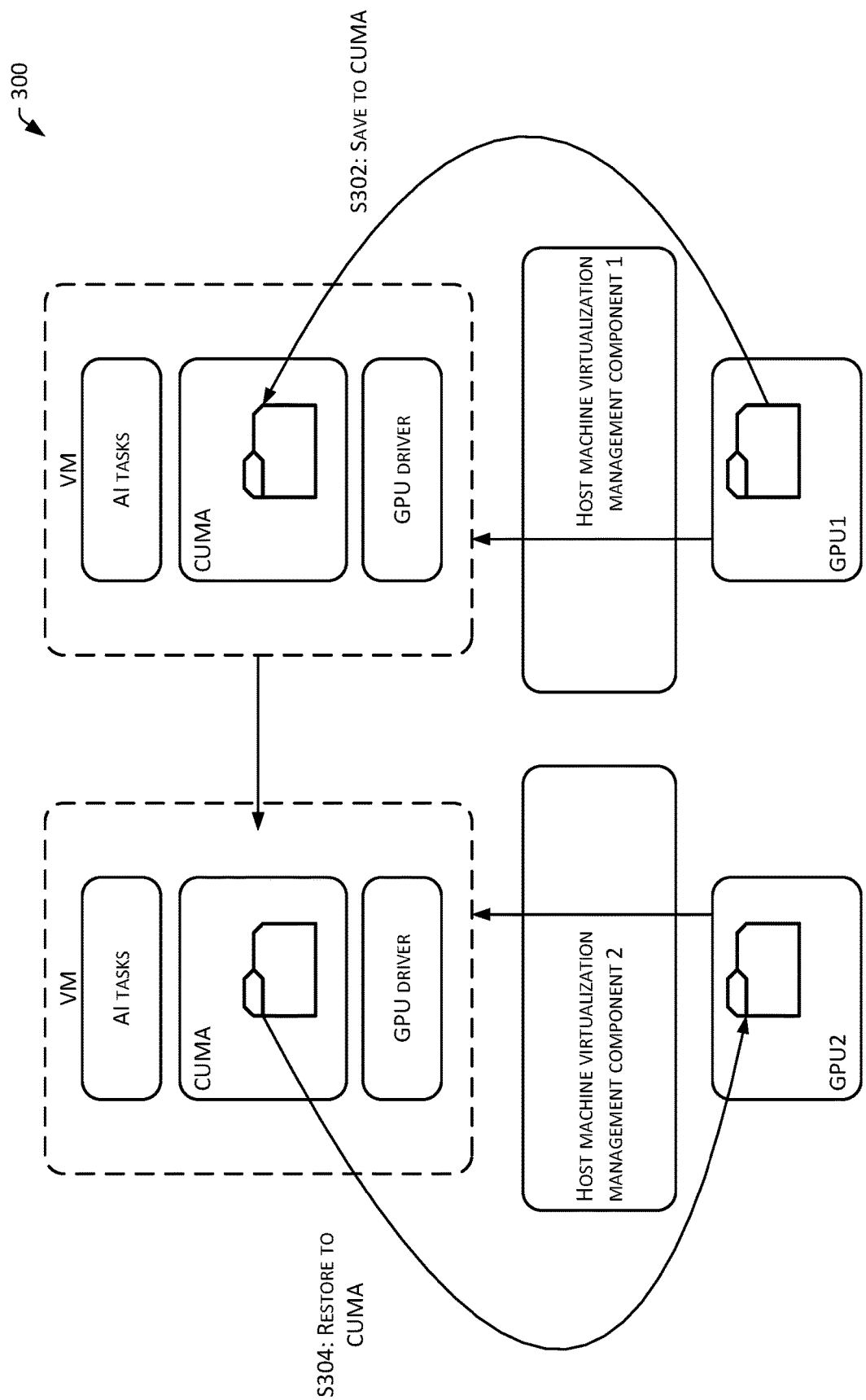
FIG. 3 is a schematic diagram of a live migration method of a virtual machine according to the embodiments of the present application.

FIG. 3 is a schematic diagram of a live migration method 300 of a virtual machine according to the embodiments of the present application. Referring to FIG. 3, an AI task (workload) of an AI application is running on a virtual machine VM. Before the migration of the virtual machine VM, the virtual machine VM runs on a first host machine. The first host machine includes a host machine virtualization management component 1 (hypervisor1) and a GPU1. The GPU1 executes the AI task in the VM in a pass-through mode under the support of the host machine virtualization management component 1 and a GPU driver in the virtual machine.

In this example, a CUMA (a migration assist module) module is deployed in the virtual machine, i.e., the migration module is configured to receive a migration instruction sent by a console. The migration instruction instructs the virtual machine to migrate to a second host machine. The second host machine includes a host machine virtualization management component 2 (hypervisor1) and a GPU2. After receiving the migration instruction, the migration module fetches memory data that is generated by the GPU1 for executing the task of the virtual machine from the memory of the GPU1, and stores the memory data in the CUMA (step S302).

After obtaining the video memory data of the CPU1, the migration module migrates the video memory data to the second host machine, and writes the video memory data into the video memory of the GPU2 of the second host machine (step S304), thereby completing the migration of the virtual machine.

In the foregoing embodiments of the present application, a virtual machine detects whether a migration instruction is received, where the virtual machine runs on a first processor of a first host machine. If the migration instruction is detected, the virtual machine calls and obtains video memory data generated in the first processor. The virtual machine migrates the video memory data to a second processor of a second host machine. According to the solution, through the migration instruction detected by the virtual machine, the video memory data of the first processor is stored in the virtual machine, and the video memory data of the first processor is migrated by the virtual machine to the video memory of the second processor, thus realizing a live migration of the virtual machine between different host machines.

Therefore, the embodiments of the application solve the technical problem that a virtual machine using a GPU pass-through mode fails to perform a live migration between host machines in the existing technologies.

In implementations, whether a migration instruction is received is detected by a migration module running on the virtual machine. If the migration module detects the migration instruction, the migration module controls processing unit(s) in the first processor to suspend receiving new tasks, and/or release the video memory of the first processor.

In implementations, when the virtual machine detects a migration instruction, if the processing unit(s) in the first processor continue(s) to receive a task from an AI application, all running data of the virtual machine in the video memory of the first processor cannot be ensured to be migrated to the second processor. Therefore, after the virtual machine receives the migration instruction, the processing unit(s) in the first processor need(s) to be controlled to suspend receiving new tasks, and release the video memory in the first processor.

In implementations, the migration module of the virtual machine includes a control unit. After receiving the migration instruction, the control unit controls all processing units in the first processor to suspend receiving new tasks, and releases the video memory of the first processor, thereby starting to perform migration of the virtual machine.

In implementations, if the migration module detects the migration instruction, the method further includes: the migration module determining whether all processing units in the first processor finish executing; and entering the step of storing the video memory data generated by the first processor if all the processing units in the first processor finish executing.

In implementations, the step of storing the video memory data of the first processor can be executed only after all the processing units in the first processor finish executing.

In implementations, the migration module further includes a tracking unit. After the control unit of the migration module receives the migration instruction, controls all the processing units to suspend receiving new tasks, and release the video memory of the first processor, the tracking unit tracks a running state of each processing unit in the first processor to determine whether all the processing units in the first processor finish executing, and starts to store the video memory data of the first processor after all the processing units in the first processor finish executing.

In the above solution, after the migration instruction is received, the processing units of the first processor are first stopped from receiving new tasks, and then the video memory data of the first processor is stored after determining that all the processing units finish executing. Thus, all computational results that are obtained by the first processor for operating the tasks of the virtual machine can be migrated to the second host machine, and the virtual machine can smoothly continue to run after being migrated to the second host machine.

In implementations, the migration module determining whether all the processing units in the first processor finish executing includes: the migration module intercepting a first preset interface of each processing unit in a first image processing unit to obtain task execution information, wherein the first preset interface includes at least: a calling interface and an execution interface, and the task execution information includes at least information used for indicating the processing unit to finish executing; and the migration module determining whether each processing unit in the first processor finish executing according to the task execution information.

In implementations, the first preset interface may include a scheduling API and an execution API, the AI application running on the virtual machine sends task execution information to the first processor by calling the scheduling API and the execution API. The migration module intercepts the task execution information and determines whether all the processing units of the first processor have finished operations according to the task execution information.

In implementations, the migration module further includes an interception unit. The interception unit is configured to intercept a calling interface and an execution interface of a processing unit to obtain task execution information of an AI application. The migration module further includes a tracking unit. The interception unit sends the intercepted task execution information to the tracking unit, and the tracking unit determines whether all the processing units in the first processor finish executing according to the task execution information. In implementations, the first preset interface may include: cudaSetDevice, cudaStreamCrate, cudaLaunchHostFunc, cudaLaunchKernel, cudaStreamSynchronze, and cudaSetKernel.

In implementations, if the migration module detects a migration instruction, the method further includes: the migration module intercepting a second preset interface of a first image processing unit and obtaining video memory information, wherein the second preset interface includes at least a video memory allocation interface, and the video memory information includes at least a video memory amount and a storage position used by an application program; and the migration module storing the video memory information.

In implementations, the video memory information includes a video memory amount and a storage location corresponding to running data of an AI application, and is used for restoring the video memory data. For example, the video memory of the entire processor is up to 16 G, but a currently operating AI application only uses a part of the video memory amount, so the video memory data needs to be migrated to a specified location in the video memory of the second processor according to the video memory information stored in the migration module when the video memory data is migrated to the video memory of the second processor.

In implementations, the interception unit in the migration module may intercept the video memory allocation interface (e.g., cudaMalloc and cudafree) and obtain the video memory information, and the tracking unit performs monitoring of the video memory of the first processor according to the video memory information to determine a video memory size and a video memory location occupied by the current AI application for restoring the video memory data.

It needs to be noted that all interface calling information except for the first preset interface and the second preset interface is directly transferred to a real processing unit runtime resource library (a CUDA runtime library) for execution, to ensure the performance of the first processor. When the first preset interface and the second preset interface are called, calling information (including the task execution information and the video memory information) is intercepted by the migration module and is transferred to the tracking unit for analysis and storage. If a migration instruction is not received, the tracking unit transfers the calling information of the first preset interface and the second preset interface to a real interface (CUDA API) of a processing unit for execution. If the migration instruction is received, the tracking unit determines whether all the processing units in the first processor finish executing according to the calling information, and obtains the video memory information corresponding to the AI application program.

In implementations, after the virtual machine migrates the video memory data to the second processor of the second host machine, the method further includes: the migration module restoring the video memory data in the video memory of the second processor according to the video memory information.

In implementations, after the migration module in the virtual machine migrates the video memory data to the second host machine, the video memory data needs to be restored in the video memory of the second processor according to the video memory information, so that the virtual machine can continue to operate on the second host machine according to the restored video memory data, thereby completing the live migration of the virtual machine.

In implementations, the restoration of the video memory data may be performed by the save/restore unit in the migration module. And the save/restore unit restores the video memory data to the video memory of the second processor according to the size and the storage position of the data recorded in the video memory information.

In implementations, before the virtual machine migrates the video memory data to the second processor of the second host machine, the method further includes: the migration module triggering the virtual machine to unload an image processor driver and triggering a host machine virtualization management component of the first processor to detach an image processor hardware component. After the virtual machine migrates the video memory data to the second processor of the second host machine, the method further includes: the migration module triggering a host virtualization management component of the second processor to attach an image processor hardware component and triggering the virtual machine to load an image processor driver.

In the above solution, before the migration by the migration module, a GPU driver of the virtual machine needs to be unloaded, and an image processor hardware component needs to be detached. After the migration by the migration module, the virtual machine needs to be restarted, and an image processor hardware component needs to be attached, and then a virtual machine driver is reloaded, so that the virtual machine can be re-run on the second host machine.

Figure 4:
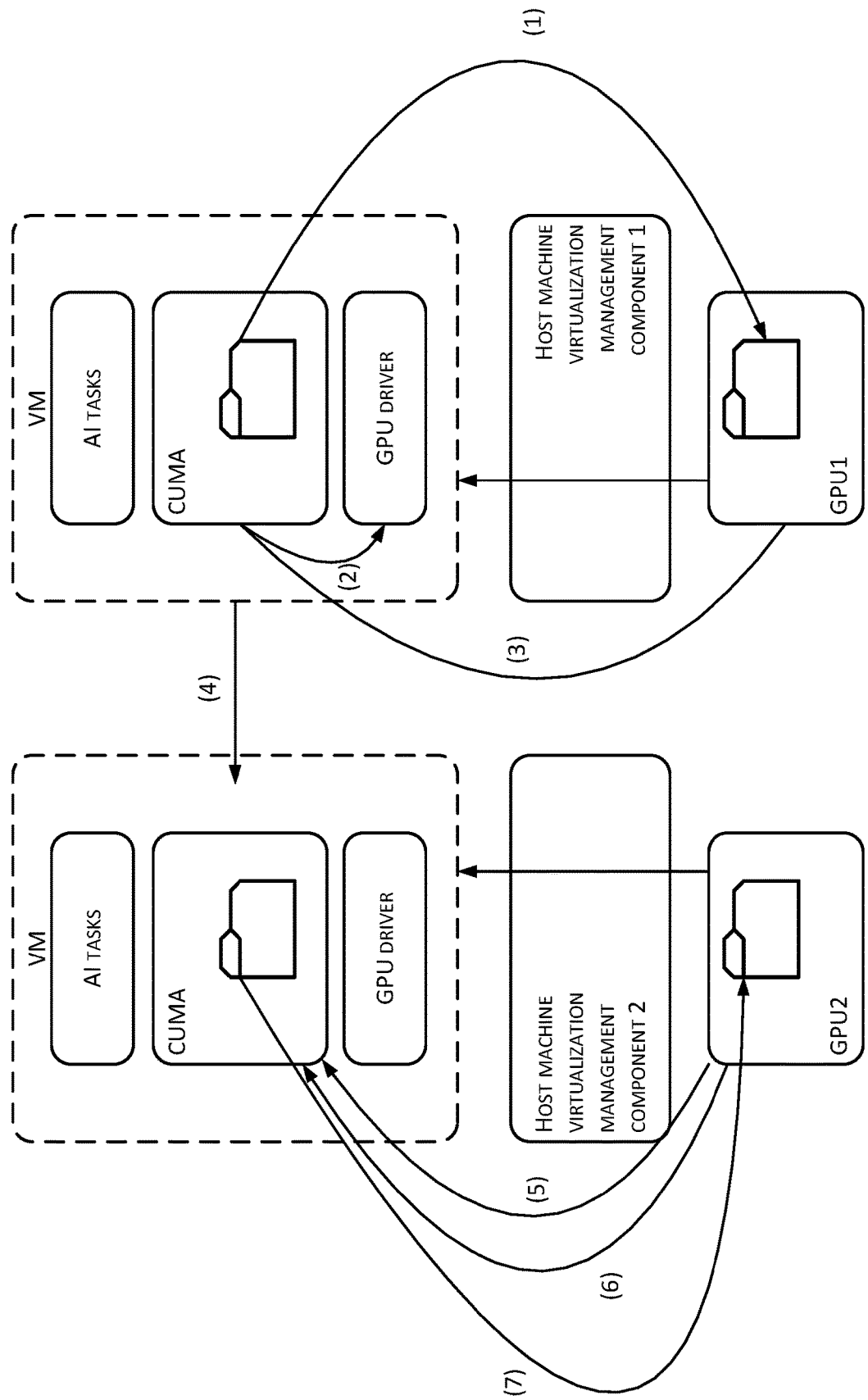
FIG. 4 is a schematic diagram of a control unit performing a migration according to the embodiments of the present application.

FIG. 4 is a schematic diagram of a control unit that executes migration according to the embodiments of the present application. In implementations, a first processor is still taken as a GPU as an example, and a control unit in a migration module may execute the following steps during a migration process:

(1) The control unit receives a live migration request, calls a tracking unit to suspend all processing units (CUDA) from receiving new tasks, calls a save/restore unit to complete storage of GPU video memory data, and releases all allocated GPU resources.

(2) The control unit triggers a GPU driver in a virtual machine to perform unloading (unload).

(3) The control unit triggers a host machine virtualization management component (hypervisor) to detach a GPU hardware component.

(4) The control unit performs a live migration of the virtual machine.

(5) The control unit triggers the hypervisor to attach a currently new GPU hardware component to the virtual machine.

(6) The control unit activates the virtual machine, and reloading (reload) of a driver is completed by an internal control unit of the virtual machine.

(7) A save/restore unit restores video memory data stored in a CUMA into a new GPU, and the control unit informs the tracking unit to continue to run call(s) of application program(s).

Thus, the overall live migration process is completed, and AI application(s) can continue to execute on the virtual machine.

It should be noted that the foregoing method embodiments are described as a series of actions for the simplicity of description. One skilled in the art, however, should understand that the present disclosure is not limited by the described orders of actions, because some steps may be performed in other orders or in parallel in accordance with the present disclosure. Furthermore, one skilled in the art should also understand that the embodiments described in the specification are exemplary embodiments, and actions and modules involved may not be necessarily required by the present disclosure.

Through the above description of the embodiments, one skilled in the art can clearly understand that the methods according to the above embodiments can be implemented by software plus a necessary general hardware platform, and apparently can also be implemented by hardware. However, the former is a better implementation mode in many cases. Based on such understanding, the essence of the technical solutions of the present disclosure or the parts that make contributions to the existing technologies may be embodied in a form of a software product. Such computer software product is stored in a storage medium (e.g., ROM/RAM, a magnetic disk, an optical disk), and includes a number of instructions to enable a terminal device (e.g., a mobile phone, a computer, a server, or a network device, etc.) to execute the methods according to the embodiments of the present disclosure.

Figure 5:
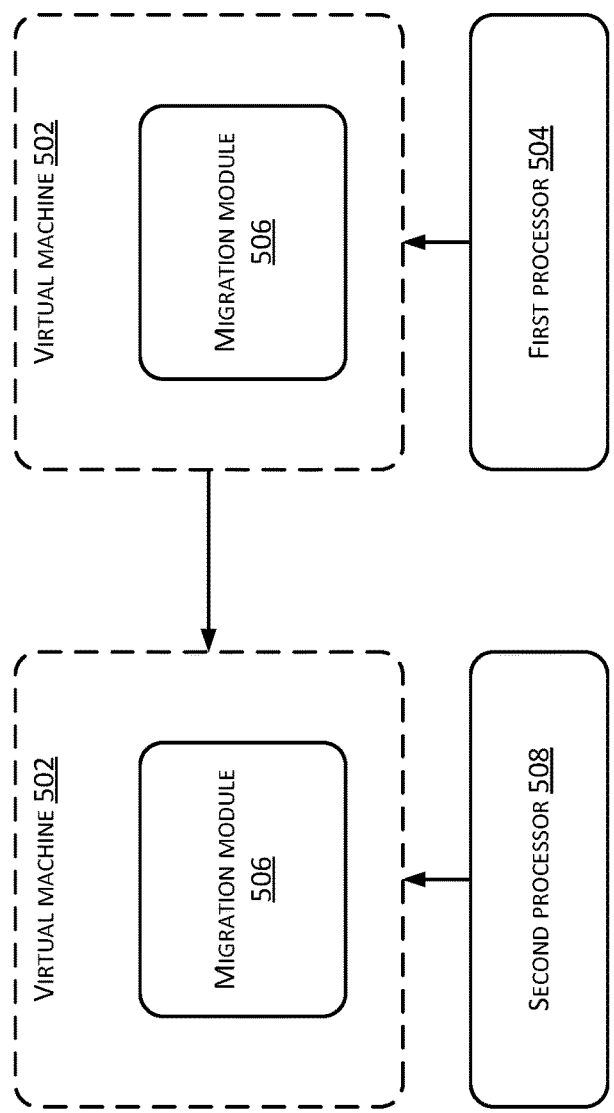
FIG. 5 is a schematic diagram of a migration system of a virtual machine according to the embodiments of the present application.

According to the embodiments of the present disclosure, an embodiment of a virtual machine migration system is further provided. FIG. 5 is a schematic diagram of a virtual machine migration system 500 according to the embodiments of the present application. As shown in the drawing, the system includes:

a virtual machine 502, running on a first processor 504 of a first host machine.

In implementations, the virtual machine runs on the first host machine, and the first processor 504 in the first host may be a GPU in a pass-through mode, and provide services to the virtual machine in the pass-through mode. By adopting a GPU pass-through mode, an overhead of an abstraction layer caused by a GPU sharing mode can be avoided, and the delivery performance is similar to that of a special desktop.

In implementations, a migration module is deployed in the virtual machine, and the migration module in the virtual machine detects a migration instruction sent by a console. After receiving the migration instruction sent by the console, the migration module starts to migrate the virtual machine.

a migration module 506, running on the virtual machine, and configured to store video memory data generated by the first processor and migrate the video memory data to a second processor 508 of a second host machine if the migration module receives a migration instruction.

In implementations, the video memory data generated by the first processor includes an operation result obtained when the first processor operates a task of the virtual machine.

In implementations, the first processor is a GPU. AI application(s) is/are run on the virtual machine, and is/are processed by a plurality of processing units (CUDA cores) included in the GPU. The processing units execute tasks of the AI application(s) and store an operation result in a video memory of the GPU.

In the above solution, after the migration module receives a migration instruction, the migration module obtains video memory data that is generated by the first processor for executing task(s) of the virtual machine from a video memory of the first processor, and stores the obtained video memory data in a save/restore unit of the migration module.

In the above solution, the video memory data is migrated to a second processor of a second host machine by the migration module in the virtual machine. The second host machine is a destination host, i.e. a host indicated in the migration instruction.

The second processor may still be a GPU in a pass-through mode. After the virtual machine migrates the video memory data into the second processor, the virtual machine may continue to operate with the support of the second processor according to the migrated video memory data, thereby completing a live migration of the virtual machine from the first host machine to the second host machine.

FIG. 3 is a schematic diagram of a live migration method 300 of a virtual machine according to the embodiments of the present application. Referring to FIG. 3, an AI task (workload) of an AI application is running on a virtual machine VM. Before the migration of the virtual machine VM, the virtual machine VM runs on a first host machine. The first host machine includes a host machine virtualization management component 1 (hypervisor1) and a GPU1. The GPU1 executes the AI task in the VM in a pass-through mode under the support of the host machine virtualization management component 1 and a GPU driver in the virtual machine.

In this example, a CUMA (a migration assist module) module is deployed in the virtual machine, i.e., the migration module is configured to receive a migration instruction sent by a console. The migration instruction instructs the virtual machine to migrate to a second host machine. After receiving the migration instruction, the migration module fetches memory data that is generated by the GPU1 for executing the task of the virtual machine from the memory of the GPU1, and stores the memory data in the CUMA (step S302).

After obtaining the video memory data of the CPU1, the migration module migrates the video memory data to the second host machine, and writes the video memory data into the video memory of the GPU2 of the second host machine (step S304), thereby completing the migration of the virtual machine.

In the foregoing embodiments of the present application, a migration module of a virtual machine detects whether a migration instruction is received. If detecting the migration instruction, the migration module saves video memory data generated in the first processor, and migrates the video memory data to a second processor of a second host machine. According to the solution, through the migration instruction detected by the virtual machine, the video memory data of the first processor is stored in the virtual machine, and the video memory data of the first processor is migrated by the virtual machine to the video memory of the second processor, thus realizing a live migration of the virtual machine between different host machines.

Therefore, the embodiments of the application solve the technical problem that a virtual machine using a GPU pass-through mode fails to perform a live migration between host machines in the existing technologies.

In implementations, the migration module includes: a tracking unit used for controlling processing units in the first processor to pause receiving tasks and determining whether all the processing units in the first processor finish executing when the migration module receives the migration instruction; a save/restore unit used for storing the video memory data generated by the first processor after the tracking unit determines that all the processing units finish executing; a control unit used for migrating the video memory data to the second processor, wherein the save/restore unit is further used for restoring the video memory data to a video memory of the second processor after the video memory data is migrated to the second processor.

In implementations, the tracking unit is used for obtaining running states of all the processing units in the first processor, and calling the save/restore unit to store the video memory data after all the processing units finish executing. After the control unit migrates the video memory data to the second processor, the save/restore unit restores the video memory data to the video memory of the second processor.

In implementations, the migration module further includes: an interception unit used for obtaining task execution information by intercepting a first preset interface of each processing unit in the first processor, wherein the first preset interface includes at least: a calling interface and an execution interface, and the task execution information includes at least information for instructing the processing units to finish executing; and a tracking unit, which is connected with the interception unit, used for determining whether all processing units in the first processor finish executing according to the task execution information.

In implementations, the first preset interface may include a scheduling API and an execution API. An AI application running on the virtual machine sends task execution information to the first processor by calling the scheduling API and the execution API, and the migration module intercepts the task execution information and determines whether all the processing units of the first processor are finished running according to the task execution information.

In implementations, an interception unit in the migration module intercepts a calling interface and an execution interface of a processing unit to obtain task execution information of an AI application. The migration module further includes a tracking unit. The interception unit sends the intercepted task execution information to the tracking unit, and the tracking unit determines whether all the processing units in the first processor finish executing according to the task execution information. In implementations, the first preset interface may include: cudaSetDevice, cudaStreamCrate, cudaLaunchHostFunc, cudaLaunchKernel, cudaStreamSynchronze, and cudaSetKernel.

When the first preset interface is called, the first preset interface is intercepted by the interception unit, and calling information is sent to the tracking unit to be analyzed and stored. The tracking unit monitors a CUDA stream according to information obtained by the interception unit from intercepting the first preset interface. When the tracking unit receives a migration instruction, the tracking unit temporarily blocks operations of the CUDA stream of App (through cudaLaunchHostFunc and cudaLaunchKernel), and determines whether operations of all processing units are finished by calling an operation of cudaStreamSynchronize.

In implementations, the interception unit is further used for obtaining video memory information by intercepting a second preset interface of each processing unit of the first processor, wherein the second preset interface includes at least a video memory allocation interface, and the video memory information includes at least a video memory amount and a storage location currently used by an application program running on the virtual machine. The tracking unit stores the video memory information.

In implementations, the video memory information includes a video memory amount and a storage location corresponding to running data of an AI application, and is used for restoring the video memory data. For example, the video memory of the entire processor is up to 16 G, but a currently operating AI application only uses a part of the video memory amount. Therefore, when the video memory data is migrated to the video memory of the second processor, the video memory data needs to be migrated to a specified location in the video memory of the second processor according to the video memory information stored in the migration module.

In implementations, the interception unit in the migration module may intercept a video memory allocation interface (e.g., cudaMalloc and cudafree), and obtain video memory information. The tracking unit performs monitoring of the video memory of the first processor according to the video memory information to determine a video memory size and a video memory location occupied by a current AI application for restoring the video memory data.

It needs to be noted that all interface calling information except for the first preset interface and the second preset interface is directly transferred to a real processing unit runtime resource library (a CUDA runtime library) for execution, to ensure the performance of the first processor. When the first preset interface and the second preset interface are called, calling information (including the task execution information and the video memory information) is intercepted by the migration module and is transferred to the tracking unit for analysis and storage. If a migration instruction is not received, the tracking unit transfers the calling information of the first preset interface and the second preset interface to a real interface (CUDA API) of a processing unit for execution. If the migration instruction is received, the tracking unit determines whether all the processing units in the first processor finish executing according to the calling information, and obtains the video memory information corresponding to the AI application program.

Figure 6:
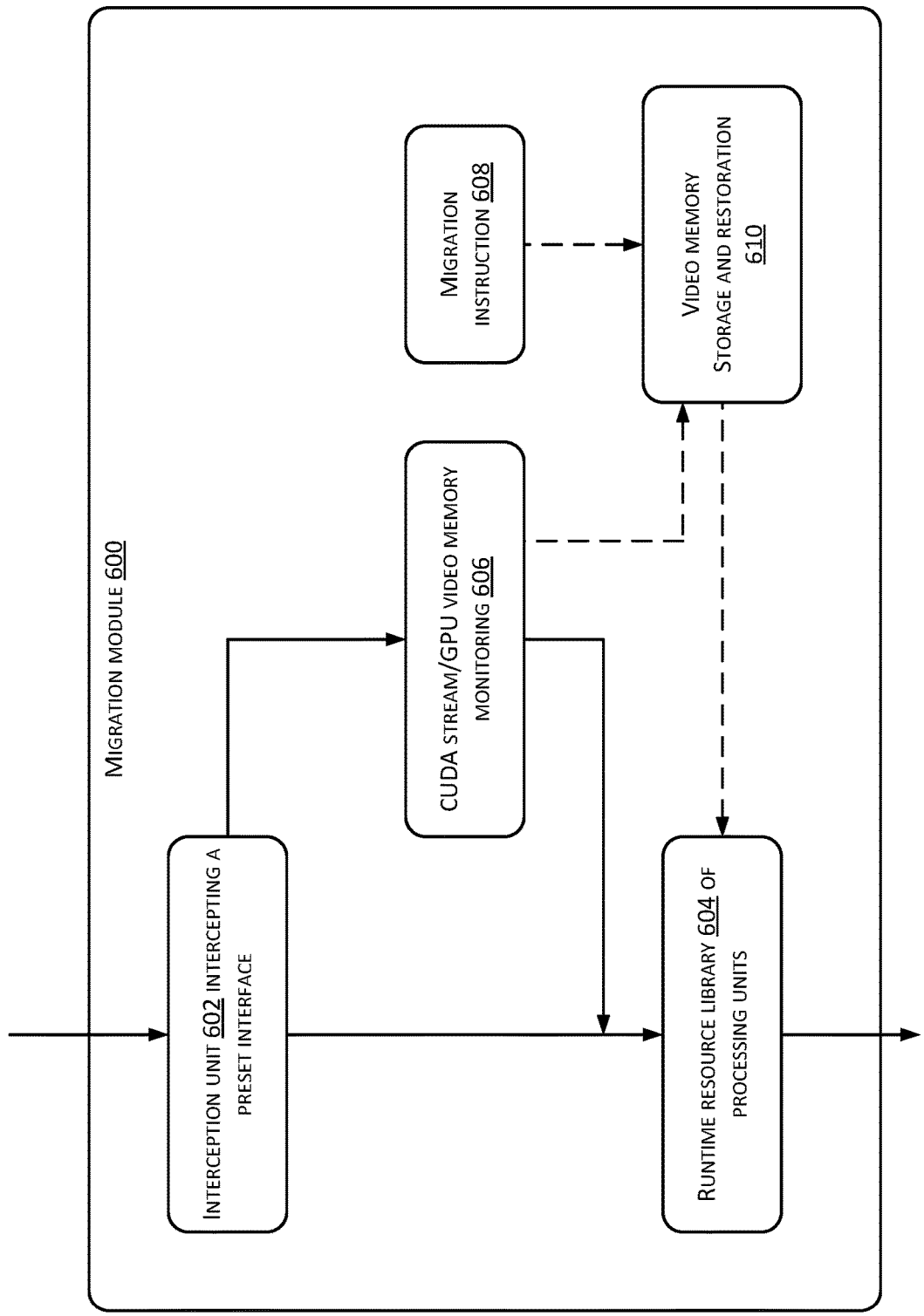
FIG. 6 is a schematic diagram of a migration module in operation according to the embodiments of the present application.

FIG. 6 is a schematic diagram of operations of a migration module 600 according to the embodiments of the present application. Referring to FIG. 6, firstly, an interception unit 602 intercepts a preset interface of each processing unit in a first processor, and directly sends calling information of a non-preset interface to a runtime resource library 604 (a CUDA runtime library) of processing units for execution. For calling information of a preset interface, a tracking unit monitors 606 a CUDA stream and a GPU video memory according to the calling information of the preset interface.

When the tracking unit monitors the CUDA stream and the GPU video memory, the control unit monitors migration instructions. If the control unit receives a migration instruction 608 of a console, the tracking unit waits for a completion of operations of all processing units in the first processor, and calls the save/restore unit to store 610 the video memory data that is generated by the first processor for processing tasks of the virtual machine under a condition that the operations of all the processing units are completed. If the control unit does not receive a migration instruction, the tracking unit returns the calling information of the preset interface that is called to a runtime resource library of processing units for execution.

Using a solution of intercepting a preset interface enables a migration of a virtual machine to be detectable. If a migration module provided by the present application is used for migrating a virtual machine, a determination can be made as to whether a CUDA runtime API is intercepted when determining whether the virtual machine is migrated. For example, a calling stack of a current CUDA libcuda.so can be checked through tools such as gdb, ldd, strace, perf, etc., to check whether the API is intercepted. If being intercepted, a determination is made that the virtual machine is migrated. A UUID or S/N number of a GPU can also be read inside the virtual machine. If the S/N has been changed, a determination is made that the virtual machine has been migrated.

In implementations, the first processor runs a target application, and the migration module runs between the target application and a processing unit of the first processor.

In implementations, the migration module includes at least one interface disposed outside of a dynamic library of processing units.

In implementations, a CUMA module runs between an AI application on the virtual machine and a cuda runtime library, and wraps a layer of CUMA interface outside libcuda.so. All API calls of an AI/CUDA application program are sent to the migration module, and are processed by a real CUDA library after being recorded. Therefore, there is no performance loss during program execution. The AI/CUDA application program also does not need to be compiled again. It is completely transparent to an owner of the application program.

In implementations, the control unit is further configured to initialize the second processor in the second host machine.

After the video memory data is migrated to the second processor of the second host machine, the migration module needs to initialize the second processor and activate the virtual machine on the second host machine, so that the virtual machine continues to run on the second host machine.

In implementations, the control unit is further configured to trigger the virtual machine to unload an image processor driver and trigger a host virtualization management component of the first processor to detach an image processor hardware component before the migration module migrates the video memory data into the second processor of the second host machine; and triggers a host virtualization management component of the second processor to attach an image processor hardware component, and triggers the virtual machine to load an image processor driver after the migration module migrates the video memory data to the second processor of the second host machine.

In the above solution, before the migration by the migration module, a GPU driver of the virtual machine needs to be unloaded, an image processor hardware component needs to be detached. After the migration by the migration module, the virtual machine needs to be restarted, and an image processor hardware component needs to be attached, and then a virtual machine driver is reloaded, so that the virtual machine can be re-run on the second host machine.

Figure 7:
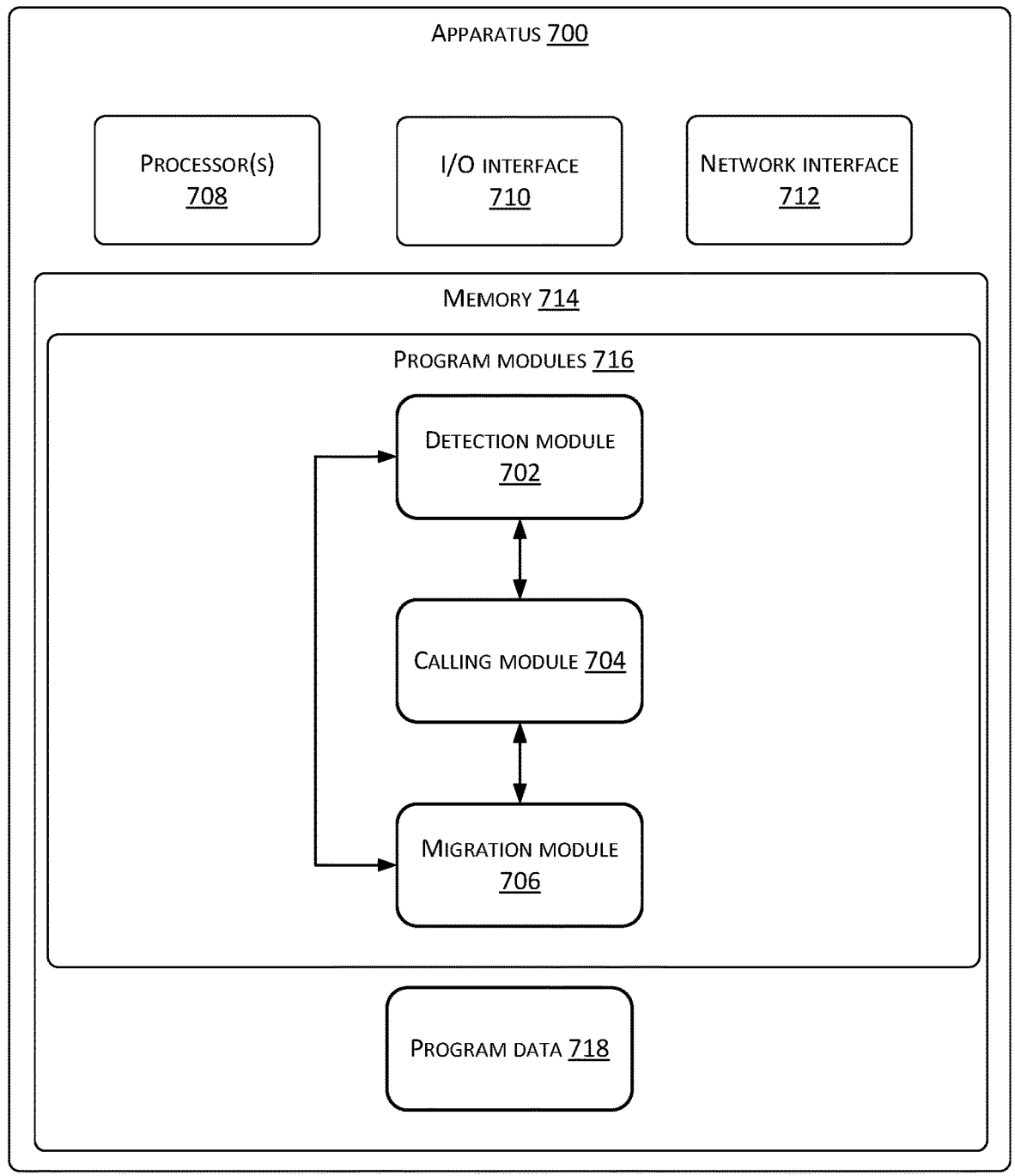
FIG. 7 is a schematic diagram of a migration method of a virtual machine according to the embodiments of the present application.

According to the embodiments of the present disclosure, a virtual machine migration apparatus for implementing the virtual machine migration method in the embodiments is further provided. FIG. 7 is a schematic diagram of a virtual machine migration apparatus 700 according to the embodiments of the present application. As shown in FIG. 7, the apparatus 700 includes:

a detection module 702 used by a virtual machine for detecting whether a migration instruction is received, wherein the virtual machine runs on a first processor of a first host machine;

a calling module 704 used by the virtual machine for calling video memory data generated in the first processor if the migration instruction is detected; and a migration module 706 used by the virtual machine for migrating the video memory data to a second processor of a second host machine.

It needs to be noted herein that the detection module 702, the calling module 704 and the migration module 706 correspond to steps S202 to S206. Embodiments and application scenarios of these three modules are the same as those of the corresponding steps, but are not limited to the content disclosed in the embodiments. It should be noted that the above modules, which act as parts of the apparatus, may be run in the computer terminal 10 provided in the embodiments.

In implementations, the migration module running on the virtual machine detects whether the migration instruction is received, where the migration module controls processing units in the first processor to suspend receiving new tasks and/or release a video memory of the first processor if the migration module detects the migration instruction.

In implementations, if the migration module detects the migration instruction, the apparatus further includes: a determination module used by the migration module for determining whether all the processing units in the first processor finish executing; and an entering module used for entering the step of storing the video memory data generated by the first processor if all the processing units in the first processor finish executing.

In implementations, the determination module includes: an interception submodule used by the migration module for intercepting a first preset interface of each processing unit in the first processor and obtaining task execution information, wherein the first preset interface includes at least: a calling interface and an execution interface, wherein the task execution information includes at least information for instructing the processing units to finish executing; and a determination submodule used by the migration module 706 for determining whether each processing units in the first processor finish executing according to the task execution information.

In implementations, if the migration module detects the migration instruction, the apparatus further includes: an interception module used by the migration module for intercepting a second preset interface of each processing unit of the first processor to obtain video memory information, wherein the second preset interface includes at least a video memory allocation interface, and the video memory information includes at least a video memory amount and a storage position which are currently used by an application program running on the virtual machine; and a storage module used by the migration module for storing the video memory information.

In implementations, the apparatus further includes: a restoration module used for restoring the video memory data to a video memory of the second processor according to the video memory information after the virtual machine migrates the video memory data to the second processor of the second host machine.

In implementations, the apparatus further includes: an unloading module used for triggering the virtual machine to unload an image processor driver and triggering a host machine virtualization management component of the first processor to detach an image processor hardware component before the virtual machine migrates the video memory data into the second processor of the second host machine; and a loading module used for triggering a host machine virtualization management component of the second processor to attach an image processor hardware component and triggering the virtual machine to load an image processor driver after the virtual machine migrates the video memory data into the second processor of the second host machine.

In implementations, the apparatus 700 may further include one or more processors 708, an input/output (I/O) interface 710, a network interface 712, and memory 714.

The memory 714 may include a form of computer readable media such as a volatile memory, a random access memory (RAM) and/or a non-volatile memory, for example, a read-only memory (ROM) or a flash RAM. The memory 714 is an example of a computer readable media. In implementations, the memory 714 may include program modules 716 and program data 718. The program modules 716 may include one or more of the modules as described above and shown in FIG. 7.

In implementations, the computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Figure 8:
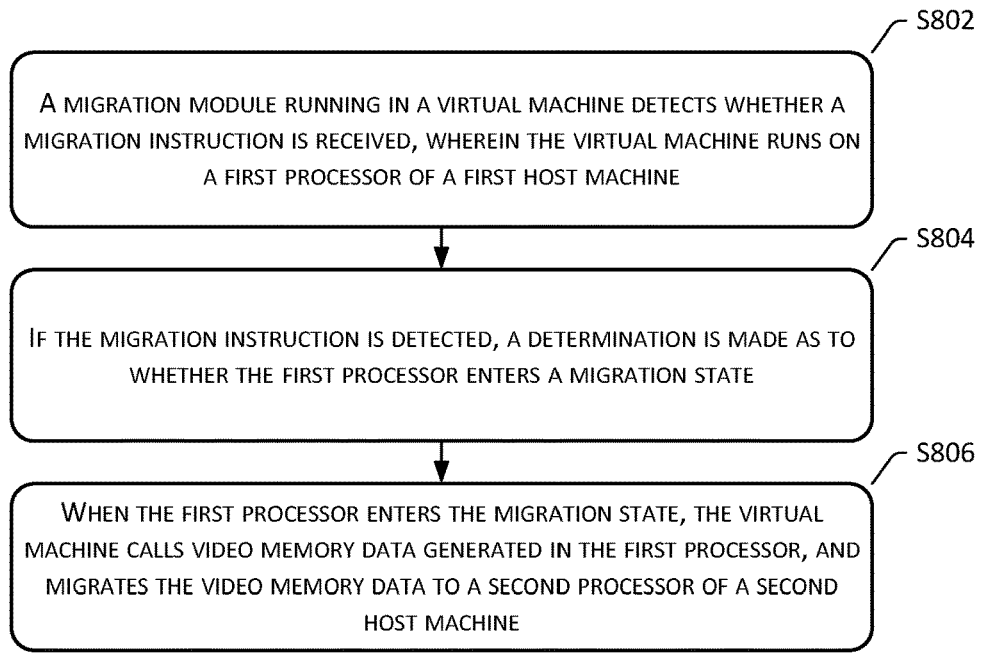
FIG. 8 is a schematic diagram of a migration method of a virtual machine according to the embodiments of the present application.

According to the embodiments of the present disclosure, a virtual machine migration method is further provided. The virtual machine migration method may be executed by the virtual machine migration system in the embodiments. FIG. 8 is a schematic diagram of a virtual machine migration method 800 according to the embodiments of the present application. As shown in FIG. 8, the method includes the following steps:

At step S802, a migration module running in a virtual machine detects whether a migration instruction is received, wherein the virtual machine runs on a first processor of a first host machine.

In implementations, the virtual machine runs on the first host machine, and the first processor in the first host may be a GPU in a pass-through mode, and provides services to the virtual machine in the pass-through mode. By adopting a GPU pass-through mode, an overhead of an abstraction layer caused by a GPU sharing mode can be avoided, and the delivery performance is similar to that of a special desktop.

In implementations, a migration module is disposed in a virtual machine, and the migration module in the virtual machine detects a migration instruction sent by a console. After receiving the migration instruction sent by the console, the migration module starts to migrate the virtual machine.

At step S804, if the migration instruction is detected, a determination is made as to whether the first processor enters a migration state.

In implementations, the above steps may be performed by a tracking unit in the migration module. In implementations, the tracking unit monitors an operating state of each processing unit in the first processor and a video memory state of the first processor, so that when a migration instruction is detected, a determination about whether the first processor enters a migration status can be made.

In implementations, a determination that the first processor enters the migration state is made if each processing unit in the first processor finishes executing.

At step S806, when the first processor enters the migration state, the virtual machine calls video memory data generated in the first processor, and migrates the video memory data to a second processor of a second host machine.

In the above solution, the video memory data is migrated to a second processor of a second host machine by the migration module in the virtual machine. The second host machine is a destination host, i.e. a host indicated in the migration instruction.

The second processor may still be a GPU in a pass-through mode. After the virtual machine migrates the video memory data into the second processor, the virtual machine may continue to operate with the support of the second processor according to the migrated video memory data, thereby completing a live migration of the virtual machine from the first host machine to the second host machine.

FIG. 3 is a schematic diagram of a live migration method 300 of a virtual machine according to the embodiments of the present application. Referring to FIG. 3, an AI task (workload) of an AI application is running on a virtual machine VM. Before the migration of the virtual machine VM, the virtual machine VM runs on a first host machine. The first host machine includes a host machine virtualization management component 1 (hypervisor1) and a GPU1. The GPU1 executes the AI task in the VM in a pass-through mode under the support of the host machine virtualization management component 1 and a GPU driver in the virtual machine.

In this example, a CUMA (a migration assist module) module is deployed in the virtual machine, i.e., the migration module is configured to receive a migration instruction sent by a console. The migration instruction instructs the virtual machine to migrate to a second host machine. After receiving the migration instruction, the migration module fetches memory data that is generated by the GPU1 for executing the task of the virtual machine from the memory of the GPU1, and stores the memory data in the CUMA (step S302).

After obtaining the video memory data of the CPU1, the migration module migrates the video memory data to the second host machine, and writes the video memory data into the video memory of the GPU2 of the second host machine (step S304), thereby completing the migration of the virtual machine.

In the above embodiments of the present application, a migration module running in a virtual machine detects whether a migration instruction is received, wherein the virtual machine runs on a first processor of a first host machine. If the migration instruction is detected, a determination is made as to whether the first processor enters a migration state. Under a condition that the first processor enters the migration state, the virtual machine calls and obtains video memory data generated in the first processor and migrates the video memory data to a second processor of a second host machine. According to the above solution, a migration module is deployed in a virtual machine, and the migration module performs information interception and reconstruction in the first host machine, which achieves monitoring of a state of the first processor. When the virtual machine detects a migration instruction, by using the migration module to monitor whether the first processor enters a migration state, video memory data of the first processor are stored in the virtual machine after the first processor enters the migration state, and the video memory data are migrated to a video memory of a second processor, thus implementing a live migration of the virtual machine between different host machines.

Therefore, the embodiments of the application solve the technical problem that a virtual machine using a GPU pass-through mode fails to perform a live migration between host machines in the existing technologies.

In implementations, determining whether the first processor enters the migration state includes: the migration module obtaining task execution information by intercepting a first preset interface of each processing unit in the first processor, wherein the first preset interface includes at least: a calling interface and an execution interface, and the task execution information includes at least information for instructing the processing units to finish executing; and the migration module determining whether all processing units in the first processor finish executing according to the task execution information; and determining that the first processor enters the migration state if all the processing units finish executing.

In implementations, the first preset interface may include a scheduling API and an execution API. An AI application running on the virtual machine sends task execution information to the first processor by calling the scheduling API and the execution API, and the migration module intercepts the task execution information and determines whether all the processing units of the first processor are finished running according to the task execution information.

In implementations, the migration module further includes an interception unit, and the interception unit is used for intercepting a calling interface and an execution interface of a processing unit to obtain task execution information of an AI application. The migration module further includes a tracking unit. The interception unit sends the intercepted task execution information to the tracking unit, and the tracking unit determines whether all the processing units in the first processor finish executing according to the task execution information. In implementations, the first preset interface may include: cudaSetDevice, cudaStreamCrate, cudaLaunchHostFunc, cudaLaunchKernel, cudaStreamSynchronze, and cudaSetKernel.

Figure 9:
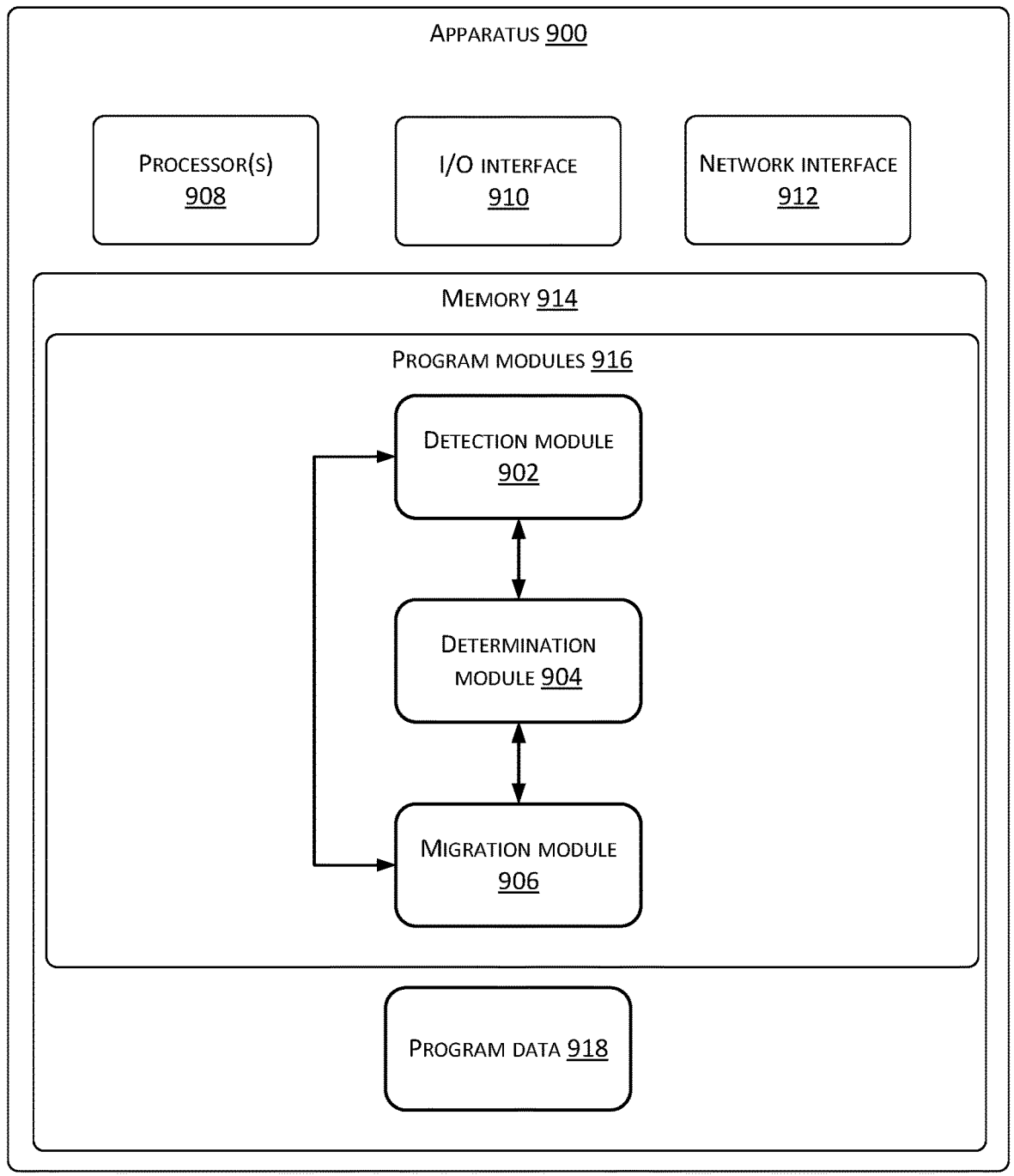
FIG. 9 is a schematic diagram of a migration method of a virtual machine according to the embodiments of the present application.

According to the embodiments of the present disclosure, a virtual machine migration apparatus for implementing the virtual machine migration method in the embodiments is further provided, where FIG. 9 is a schematic diagram of a virtual machine migration apparatus 900 according to the embodiments of the present application. As shown in FIG. 5, the apparatus 900 includes:
- a detection module 902 used by a migration module running in a virtual machine to detect whether a migration instruction is received, wherein the virtual machine runs on a first processor of a first host machine;
- a determination module 904 used for determining whether the first processor enters a migration state if the migration instruction is detected;
- a migration module 906 used by the virtual machine for calling and obtaining video memory data generated in the first processor, and migrating the video memory data to a second processor of a second host machine when the first processor enters the migration state.

It should be noted here that the detection module 902, the determination module 904, and the migration module 906 correspond to steps S802 to S806 in the embodiments. Embodiments and application scenarios of these three modules are the same as those of the corresponding steps, but are not limited to the content disclosed in the embodiments. It should be noted that the above modules, which act as parts of the apparatus, may be run in the computer terminal 10 provided in the embodiments.

In implementations, the determination module 904 includes: an interception submodule used by the migration module 906 for intercepting a first preset interface of each processing unit in the first processor and obtaining task execution information, wherein the first preset interface includes at least: a calling interface and an execution interface, wherein the task execution information includes at least information for instructing the processing units to finish executing; a judgement submodule used by the migration module for determining whether each processing units in the first processor finish executing according to the task execution information; and a determination submodule used for determining that the first processor enters the migration state if all the processing units finish executing.

In implementations, the apparatus 900 may further include one or more processors 908, an input/output (I/O) interface 910, a network interface 912, and memory 914.

The memory 920 may include a form of computer readable media as described in the foregoing description. In implementations, the memory 914 may include program modules 916 and program data 918. The program modules 916 may include one or more of the modules as described above and shown in FIG. 9.

The embodiments of the present disclosure can provide a computer terminal which can be any computer terminal device in a computer terminal group. In implementations, in implementations, the computer terminal may also be replaced by a terminal device such as a mobile terminal.

In implementations, in implementations, the computer terminal may be located in at least one network device of a plurality of network devices of a computer network.

In implementations, the computer terminal may execute program codes of the following steps in a virtual machine migration method: a virtual machine detecting whether a migration instruction is received, wherein the virtual machine runs on a first processor of a first host machine; the virtual machine calling and obtaining video memory data generated in the first processor if the migration instruction is detected; and the virtual machine migrating the video memory data to a second processor of a second host machine.

Figure 10:
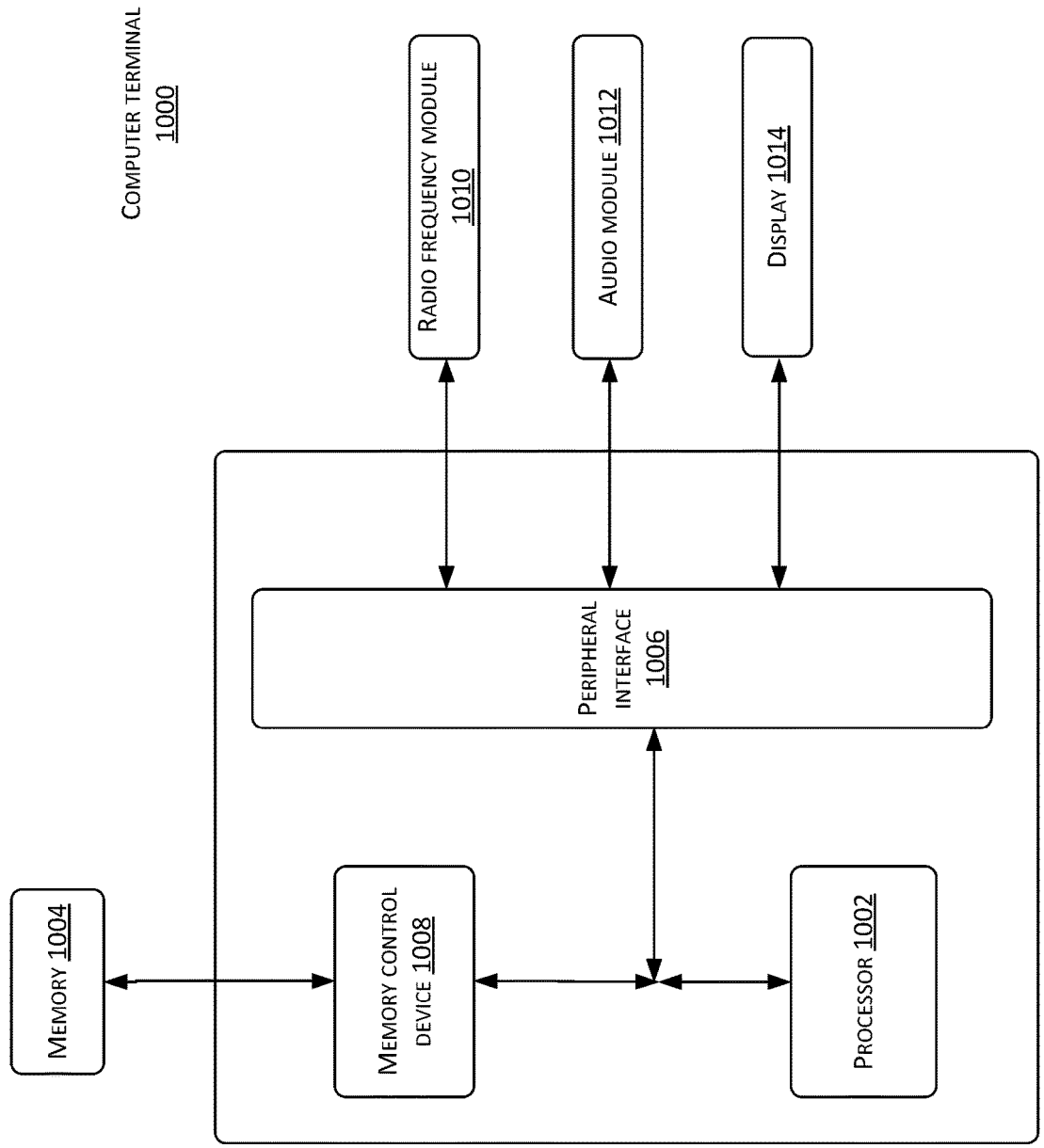
FIG. 10 is a block diagram of a computer terminal according to the embodiments of the present disclosure.

In implementations, FIG. 10 is a block diagram of a computer terminal 1000 according to the embodiments of the present disclosure. As shown in FIG. 10, the computer terminal 1000 may include: one or more (only one shown) processors 1002, a memory 1004, and a peripheral interface 1006. In implementations, the computer terminal 1000 may further includes a memory control device 1008, a radio frequency module 1010, an audio module 1012, and/a display 1014.

The memory 1004 may be configured to store software programs and modules, such as program instructions/modules corresponding to the virtual machine migration methods and apparatuses in the embodiments of the present disclosure. The processor 1002 executes various types of functional applications and data processing by running the software programs and modules stored in the memory 1004, i.e., implementing the virtual machine migration methods as described above. The memory 1004 may include high speed random access memory, and may also include non-volatile memory, such as one or more magnetic storage devices, flash memory, or other non-volatile solid-state storage devices. In some examples, the memory may further include storage devices remotely located from the processor, and these remote storage devices may be connected to the terminal A through a network. Examples of such network include, but are not limited to, the Internet, an intranets a local area network, a mobile communication network, and a combination thereof.

The processor 1002 can call information and an application program stored in the memory through a transmission device to execute the following steps: a virtual machine detecting whether a migration instruction is received, wherein the virtual machine runs on a first processor of a first host machine; the virtual machine calling and obtaining video memory data generated in the first processor if the migration instruction is detected; and the virtual machine migrating the video memory data to a second processor of a second host machine.

In implementations, the processor may further execute program codes of the following steps: detecting, by a migration module running on the virtual machine, whether the migration instruction is received, wherein the migration module controls processing units in the first processor to suspend receiving new tasks and/or release a video memory of the first processor if the migration module detects the migration instruction.

In implementations, the processor may further execute program codes of the following steps: the migration module determining whether all processing units in the first processor finish executing if the migration module detects the migration instruction; and entering a step of storing the video memory data generated by the first processor if all the processing units in the first processor finish executing.

In implementations, the processor may further execute program codes of the following steps: the migration module intercepting a first preset interface of each processing unit in the first processor, and obtaining task execution information, wherein the first preset interface includes at least: a calling interface and an execution interface, and the task execution information includes at least information for instructing the processing units to finish executing; and the migration module determining whether each processing unit in the first processor finishes executing according to the task execution information.

In implementations, the processor may further execute program codes of the following steps: the migration module intercepting a second preset interface of each processing unit of the first processor to obtain video memory information if the migration module detects the migration instruction, wherein the second preset interface includes at least a video memory allocation interface, and the video memory information includes at least a video memory amount and a storage position currently used by an application program running on the virtual machine; and the migration module storing the video memory information.

In implementations, the processor may further execute program codes of the following steps: the migration module restoring the video memory data to a video memory of the second processor according to the video memory information after the virtual machine migrates the video memory data to the second processor of the second host machine.

In implementations, the processor may further execute program codes of the following steps: before the virtual machine migrates the video memory data to the second processor of the second host machine, the migration module triggering the virtual machine to unload an image processor driver and triggering a host machine virtualization management component of the first processor to detach an image processor hardware component; and after the virtual machine migrates the video memory data to the second processor of the second host machine, the migration module triggering a host virtualization management component of the second processor to attach the image processor hardware component and triggering the virtual machine to load the image processor driver.

The embodiments of the present disclosure provide a solution of migration of a virtual machine. A virtual machine detects whether a migration instruction is received, wherein the virtual machine runs on a first processor of a first host machine. If the migration instruction is detected, the virtual machine calls and obtains video memory data generated in the first processor. The virtual machine migrates the video memory data to a second processor of a second host machine. According to the solution, through the migration instruction detected by the virtual machine, the video memory data of the first processor is stored in the virtual machine, and the video memory data of the first processor is migrated to the video memory of the second processor by the virtual machine, thus achieving a live migration of the virtual machine between different host machines.

Therefore, the embodiments of the application solve the technical problem that a virtual machine using a GPU pass-through mode fails to perform a live migration between host machines in the existing technologies.

It can be understood by one skilled in the art that the structure shown in FIG. 10 is only an illustration, and the computer terminal may also be a terminal device such as a smart phone (e.g., an Android phone, an iOS phone, etc.), a tablet computer, a handheld computer, a mobile internet device (MID), a PAD, and the like. FIG. 10 does not limit the structure of the electronic device. For example, the computer terminal 10 may also include more or fewer components (e.g., a network interface, a display device, etc.) than those shown in FIG. 10, or have a configuration different from that shown in FIG. 10.

One skilled in the art can understand that all or part of the steps in the methods of the above embodiments may be implemented by instructing hardware associated with a terminal device through a program. The program may be stored in a computer-readable storage medium. The storage medium may include: a flash drive, a read-only memory (ROM), a random access memory (RAM), a magnetic disk, or an optical disk, etc.

The embodiments of the present disclosure also provide a storage medium. In implementations, in implementations, the storage medium may be configured to store program codes that are executed by the virtual machine migration methods provided in the embodiments.

In implementations, in implementations, the storage medium may be located in any one of computer terminals in a computer terminal group in a computer network, or in any one of mobile terminals in a mobile terminal group.

In implementations, in implementations, the storage medium is configured to store program codes for performing the following steps: a virtual machine detecting whether a migration instruction is received, wherein the virtual machine runs on a first processor of a first host machine; the virtual machine calling and obtaining video memory data generated in the first processor if the migration instruction is detected; and the virtual machine migrating the video memory data to a second processor of a second host machine.

The above serial numbers of the embodiments of the present disclosure are merely intended for description, and do not represent the advantages and disadvantages of the embodiments.

In the above embodiments of the present disclosure, descriptions of various embodiments each have different emphases. For parts that are not described in detail in a certain embodiment, reference may be made to related descriptions of other embodiments.

In the embodiments provided in the present application, it should be understood that the disclosed technical content can be implemented in other ways. The above-described embodiments of the apparatus are merely illustrative. For example, a division of units is only a type of division of logical functions, and other divisions may exist in practical implementations. For example, a plurality of units or components may be combined or may be integrated into another system, or some features may be omitted, or not executed. In addition, mutual coupling, direct coupling, or communication connection that is shown or discussed may be an indirect coupling or communication connection through some interfaces, units or modules, and may be in an electrical or other form.

Units that are described as separate components may or may not be physically separate. Components that are displayed as units may or may not be physical units, may be located in a single place, or may be distributed over a plurality of network units. Some or all of the units can be selected according to actual needs to achieve the purpose of the solutions of the embodiments.

In addition, functional units in the embodiments of the present disclosure may be integrated into a single processing unit. Alternatively, each unit may exist alone physically. Alternatively, two or more units are integrated into one unit. The integrated unit can be realized in a form of hardware, and can also be realized in a form of a software functional unit.

The integrated unit, if implemented in a form of a software functional unit and sold or used as a stand-alone product, may be stored in a computer readable storage medium. Based on such understanding, the essence of the technical solutions of the present disclosure, the parts that make contributions to the existing technologies, or all or parts of the technical solutions, may be embodied in a form of a software product. Such computer software product is stored in a storage medium, and includes instructions to enable a computer device (which may be a personal computer, a server, or a network device) to execute all or part of the steps of the methods according to the embodiments of the present disclosure. And the storage medium includes various types of media capable of storing program codes, such as a U-disk, a read-only memory (ROM), a random access memory (RAM), a removable hard disk, a magnetic disk, or an optical disk, etc.

The foregoing description refers to exemplary embodiments of the present disclosure only. It should be noted that, for one skilled in the art, various modifications and improvements can be made without departing from the principles of the present disclosure. These modifications and improvements should also be regarded to fall within the scope of protection of the present disclosure.

The present disclosure can be further understood using the following clauses.

Clause 1: A virtual machine migration method comprising: a virtual machine detecting whether a migration instruction is received, wherein the virtual machine runs on a first processor of a first host machine; the virtual machine calling and obtaining video memory data generated in the first processor if the migration instruction is detected; and the virtual machine migrating the video memory data to a second processor of a second host machine.

Clause 2: The method of Clause 1, wherein whether the migration instruction is received is detected by a migration module running on the virtual machine, wherein the migration module controls processing units in the first processor to suspend receiving new tasks and/or release a video memory of the first processor if the migration module detects the migration instruction.

Clause 3: The method of Clause 2, wherein if the migration module detects the migration instruction, the method further comprises: the migration module determining whether all processing units in the first processor finish executing; and entering the step of storing the video memory data generated by the first processor if all the processing units in the first processor finish executing.

Clause 4: The method of Clause 3, wherein the migration module determining whether all the processing units in the first processor finish executing comprises: the migration module intercepting a first preset interface of each processing unit in the first processor, and obtaining task execution information, wherein the first preset interface includes at least: a calling interface and an execution interface, and the task execution information includes at least information for instructing the processing units to finish executing; and the migration module determining whether each processing unit in the first processor finishes executing according to the task execution information.

Clause 5: The method of Clause 3, wherein if the migration module detects the migration instruction, the method further comprises: the migration module intercepting a second preset interface of each processing unit of the first processor to obtain video memory information if the migration module detects the migration instruction, wherein the second preset interface includes at least a video memory allocation interface, and the video memory information includes at least a video memory amount and a storage position currently used by an application program running on the virtual machine; and the migration module storing the video memory information.

Clause 6: The method of Clause 5, wherein after the virtual machine migrates the video memory data to the second processor of the second host machine, the method further comprises: the migration module restoring the video memory data to a video memory of the second processor according to the video memory information after the virtual machine migrates the video memory data to the second processor of the second host machine.

Clause 7: The method of Clause 2, wherein: before the virtual machine migrates the video memory data to the second processor of the second host machine, the method further comprises: the migration module triggering the virtual machine to unload an image processor driver and triggering a host machine virtualization management component of the first processor to detach an image processor hardware component; and after the virtual machine migrates the video memory data to the second processor of the second host machine, the method further comprises: the migration module triggering a host virtualization management component of the second processor to attach the image processor hardware component and triggering the virtual machine to load the image processor driver.

Clause 8: A virtual machine migration system comprising: a virtual machine running on a first processor of a first host machine; and a migration module running on the virtual machine and used for storing video memory data generated by the first processor and migrating the video memory data to a second processor of a second host machine if the migration module receives a migration instruction.

Clause 9: The system of Clause 8, wherein the migration module comprises: a tracking unit used for controlling processing units in the first processor to pause receiving tasks and determining whether all the processing units in the first processor finish executing when the migration module receives the migration instruction; a save/restore unit used for storing the video memory data generated by the first processor after the tracking unit determines that all the processing units finish executing; and a control unit used for migrating the video memory data to the second processor, wherein the save/restore unit is further used for restoring the video memory data to the video memory of the second processor after the video memory data is migrated to the second processor.

Clause 10: The system of Clause 9, wherein the migration module further comprises: an interception unit used for obtaining task execution information by intercepting a first preset interface of each processing unit in the first processor, wherein the first preset interface includes at least: a calling interface and an execution interface, and the task execution information includes at least information for instructing the processing units to finish executing, wherein the tracking unit is connected with the interception unit and used for determining whether all the processing units in the first processor finish executing according to the task execution information.

Clause 11: The system of Clause 10, wherein: the interception unit is further used for obtaining video memory information by intercepting a second preset interface of each processing unit of the first processor, wherein the second preset interface includes at least a video memory allocation interface, and the video memory information includes at least a video memory amount and a storage location currently used by an application program running on the virtual machine; and the tracking unit stores the video memory information.

Clause 12: The system of Clause 8, wherein the first processor runs a target application, and the migration module runs between the target application and a processing unit of the first processor.

Clause 13: The system of Clause 8, wherein the migration module comprises at least one interface disposed outside of a dynamic library of processing units.

Clause 14: The system of Clause 9, wherein the control unit is further used for initializing the second processor in the second host machine.

Clause 15: The system of Clause 9, wherein the control unit is further used for triggering the virtual machine to unload an image processor driver and triggering a host virtualization management component of the first processor to detach an image processor hardware component before the migration module migrates the video memory data into the second processor of the second host machine; and triggering a host virtualization management component of the second processor to attach the image processor hardware component, and triggering the virtual machine to load the image processor driver after the migration module migrates the video memory data to the second processor of the second host machine.

Clause 16: A virtual machine migration method comprising: a migration module running in a virtual machine detects whether a migration instruction is received, wherein the virtual machine runs on a first processor of a first host machine; determining whether the first processor enters a migration state if the migration instruction is detected; and the virtual machine calling and obtaining video memory data generated in the first processor and migrating the video memory data to a second processor of a second host machine under a condition that the first processor enters the migration state.

Clause 17: The method of Clause 16, wherein determining whether the first processor enters the migration state comprises: the migration module intercepting a first preset interface of each processing unit in the first processor to obtain task execution information, wherein the first preset interface comprises at least: a calling interface and an execution interface, and the task execution information comprises at least information for instructing processing units to finish executing; the migration module determining whether all processing units in the first processor finish executing according to the task execution information; and determining that the first processor enters the migration state if all the processing units finish executing.

Clause 18: A storage medium, the storage medium comprising a stored program, wherein: a device on which the storage medium is located is controlled to perform the following steps when the program is executed: a virtual machine detecting whether a migration instruction is received, wherein the virtual machine runs on a first processor of a first host machine; the virtual machine calling and obtaining video memory data generated in the first processor if the migration instruction is detected; and the virtual machine migrating the video memory data to a second processor of a second host machine.

Clause 19: A processor, the processor being configured to execute a program, wherein the program, when running, executes the following steps: a virtual machine detecting whether a migration instruction is received, wherein the virtual machine runs on a first processor of a first host machine; the virtual machine calling and obtaining video memory data generated in the first processor if the migration instruction is detected; and the virtual machine migrating the video memory data to a second processor of a second host machine.

What is claimed is:

1. A method comprising:

executing a virtual machine using a graphics processor unit (GPU) pass-through mode on a first processor of a first host machine;

intercepting calling information of a first preset interface and a second preset interface of each processing unit of the first processor for analysis originally from the virtual machine, wherein the first preset interface includes at least a calling interface and an execution interface, the second preset interface includes at least a video memory allocation interface and the calling information includes task execution information and video memory information, wherein the corresponding calling information is transferred to a real interface of a corresponding processing unit of the first processor for execution before receiving a migration instruction for the virtual machine;

detecting that the migration instruction is received;

in response to detecting that the migration instruction is received, determining whether all processing units in the first processor finish executing according to the task execution information obtaining video memory data generated in the first processor according to the video memory information;

triggering the virtual machine running on the first processor to unload an image processor driver of the first host machine, and triggering a first host machine virtualization management component of the first processor to detach a first image processor hardware component of the first host machine;

after the image processor driver of the first host machine is unloaded from the virtual machine and the first image processor hardware component of the first host machine is detached, migrating the video memory data to a second processor of a second host machine, wherein the second processor is also operated in a GPU pass-through mode; and after the video memory data is migrated to the second processor of the second host machine, triggering a second host virtualization management component of the second processor to attach a second image processor hardware component of the second host machine, and triggering the virtual machine running on the second processor to load an image processor driver of the second host machine.

2. The method of claim 1, further comprising: controlling processing units in the first processor to suspend receiving new tasks or release a video memory of the first processor in response to the migration instruction is detected.

3. The method of claim 2, wherein in response to the migration instruction is detected, the method further comprises:

storing the video memory data generated by the first processor in response to all the processing units in the first processor finish executing.

4. The method of claim 3, wherein determining whether all the processing units in the first processor finish executing comprises:
obtaining the task execution information, wherein the task execution information includes at least information for instructing the processing units to finish executing; and
determining whether each processing unit in the first processor finishes executing according to the task execution information.

5. The method of claim 3, wherein in response to the migration instruction is detected, the method further comprises:
obtaining the video memory information, wherein the video memory information includes at least a video memory amount and a storage position currently used by an application program running on the virtual machine; and
storing the video memory information.

6. The method of claim 5, further comprising:
restoring the video memory data to a video memory of the second processor according to the video memory information after the video memory data is migrated to the second processor of the second host machine.

7. A system comprising:
a virtual machine running on a first processor of a first host machine that is operated in a graphics processor unit (GPU) pass-through mode; and
a migration module running on the virtual machine and used for,
intercepting calling information of a first preset interface and a second preset interface of each processing unit of the first processor for analysis from the virtual machine, wherein the first preset interface includes at least a calling interface and an execution interface, the second preset interface includes at least a video memory allocation interface and the calling information includes task execution information and video memory information,
transferring the calling information of the first preset interface and the second preset interface to a real interface of a corresponding processing unit of the first processor for execution if receiving a migration instruction,
after receiving the migration instruction and before migrating video memory data into a second processor of a second host machine that is also operated in a GPU pass-through mode:
determining whether all processing units in the first processor finish executing according to the task execution information and obtaining video memory data generated in the first processor according to the video memory information,
storing the video memory data,
triggering the virtual machine to unload an image processor driver of the first host machine, and
triggering a first host virtualization management component of the first processor to detach a first image processor hardware component of the first host machine; and
migrating the video memory data to the second processor of the second host machine.

8. The system of claim 7, wherein the migration module comprises:
a tracking unit used for controlling processing units in the first processor to pause receiving tasks and determining whether all the processing units in the first processor finish executing when the migration module receives the migration instruction;
a save/restore unit used for storing the video memory data generated by the first processor after the tracking unit determines that all the processing units finish executing; and
a control unit used for migrating the video memory data to the second processor, wherein the video memory data is restored to a video memory of the second processor after the video memory data is migrated to the second processor.

9. The system of claim 8, wherein:
the task execution information includes at least information for instructing the processing units of the first processor to finish executing, and
the tracking unit is connected with an interception unit of the migration module.

10. The system of claim 9, wherein:
the interception unit is further used for obtaining the video memory information, wherein the video memory information includes at least a video memory amount and a storage location currently used by an application program running on the virtual machine; and
the tracking unit stores the video memory information.

11. The system of claim 7, wherein the first processor runs a target application, and the migration module runs between the target application and corresponding processing unit of the first processor.

12. The system of claim 7, wherein the migration module comprises at least one interface disposed outside of a dynamic library of processing units.

13. The system of claim 8, wherein the second processor is initiated in the second host machine.

14. The system of claim 8, wherein the migration module is further used for triggering a second host virtualization management component of the second processor to attach a second image processor hardware component of the second host machine, and triggering the virtual machine running on the second processor to load an image processor driver of the second host machine after the migration module migrates the video memory data to the second processor of the second host machine.

15. A method comprising:
executing a virtual machine using a graphics processor unit (GPU) pass-through mode on a first processor of a first host machine;
intercepting calling information of a first preset interface and a second preset interface of each processing unit of the first processor for analysis, wherein the first preset interface includes at least a calling interface and an execution interface, the second preset interface includes at least a video memory allocation interface and the calling information includes task execution information and video memory information, wherein the corresponding calling information is transferred to a real interface of a corresponding processing unit of the first processor for execution before receiving a migration instruction for the virtual machine;
detecting that the migration instruction is received;
determining that the first processor enters a migration state in response to the migration instruction is detected by determining that all processing units in the first processor finish executing according to the task execution information;

obtaining video memory data generated in the first processor according to the video memory information;

triggering the virtual machine to unload an image processor driver of the first host machine, and triggering a first host machine virtualization management component of the first processor to detach a first image processor hardware component of the first host machine;

migrating the video memory data to a second processor of a second host machine in response to the first processor enters the migration state, wherein the second processor is also operated in a GPU pass-through mode; and triggering a second host virtualization management component of the second processor to attach a second image processor hardware component of the second host machine, and triggering the virtual machine running on the second processor to load an image processor driver of the second host machine.

16. The method of claim 15, wherein the task execution information comprises at least information for instructing processing units to finish executing.

17. The method of claim 15, further comprising controlling processing units in the first processor to suspend receiving new tasks or release a video memory of the first processor in response to the migration instruction is detected.

18. The method of claim 17, wherein in response to the migration instruction is detected, the method further comprises:

obtaining the video memory information, wherein the video memory information includes at least a video memory amount and a storage position currently used by an application program running on the virtual machine; and storing the video memory information.

19. The method of claim 18, further comprising:

restoring the video memory data to a video memory of the second processor according to the video memory information after the video memory data is migrated to the second processor of the second host machine.

* * * * *